(12) United States Patent
Yu et al.

(10) Patent No.: US 6,271,936 B1
(45) Date of Patent: Aug. 7, 2001

(54) COMBINING ERROR DIFFUSION, DITHERING AND OVER-MODULATION FOR SMOOTH MULTILEVEL PRINTING

(75) Inventors: Qing Yu, Rochester; Kevin E. Spaulding, Spencerport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/210,311

(22) Filed: Dec. 11, 1998

(51) Int. Cl.$^7$ .......................... H04N 1/405; H04N 1/409; G06K 15/02
(52) U.S. Cl. .......................... 358/1.9; 358/456; 358/458
(58) Field of Search .......................... 358/1.9, 456, 458, 358/457, 466, 298; 382/252, 270, 237

(56) References Cited

U.S. PATENT DOCUMENTS 5,014,333   5/1991  Miller et al. .
5,331,429 * 7/1994  Levien ................................ 358/456

OTHER PUBLICATIONS

"An adaptive algorithm for spatial greyscal," *Proceedings of the Society for Information Display*, vol. 17, No. 2, pp. 75–77, 1976, by R. W. Floyd and L. Steinberg.
"Design of minimum visual modulation halftone patterns," *IEEE Trans. Syst. Man. Cybern*, SMC–21(1), pp. 33–38, 1991, by J. R. Sullivan, et al.
"Digital halftoning technique using a blue–noise mask," *Journal of Optical Society of America* A 9(11), pp. 1920–1929, 1992, by K. J. Parker, et al.
"Methods for generating blue–noise dither matrices for digital halftoning," *Journel of Electronic Imaging*, vol. 6, pp. 208–230, Apr. 1997, by K. E. Spaulding, et al.
"Stochastic screen halftoning for electronic devices," *Journal of Visual Communication and Image Representation*, vol. 8, pp. 423–440, Dec. 1997, by Q. Yu and K. J. Parker.
"Digital multitoning evaluation with a human visual model," *Proceedings of NIP 13: International Conference on Digital Printing Technologies*, (Seattle, WA), IS&T, Nov. 1997, by Q. Yu, et al.
"An improved multilevel error diffusion method," *Journal of Imaging Science and Technology*, vol. 39, No. 6, pp. 495–501, 1995, by S. Sugiura, et al.
"Under–compensated error diffusion for multilevel printing," *Proceedings of SPIE: Color Hard Copy and Graphic Arts*, vol. 1912, pp. 482–487, 1993, by D. Birnbaum, et al.

* cited by examiner

Primary Examiner—Scott Rogers
(74) Attorney, Agent, or Firm—Peyton C. Watkins

(57) ABSTRACT

A new multitoning technique is proposed that combines error diffusion, blue-noise dithering and over-modulation in an adaptive algorithm to achieve high quality multilevel printing with smooth texture transition. A periodic dither signal is first added to an input digital image wherein the amplitude of the periodic dither signal is a function of the input pixel value for each input pixel. The amplitude of the periodic dither signal is larger for input pixel values near the N output levels, and the amplitude of the periodic dither signal is smaller for input pixel values intermediate to the N output levels to produce a modified input image. Then, a multi-level error diffusion halftoning algorithm is applied to the modified input image wherein the error diffusion halftoning algorithm uses a set of error feedback weights which are adjusted according to the original input pixel value for each input pixel. The sum of the error feedback weights is smaller for input pixel values near the N output levels, and the sum of the error feedback weights is larger for input pixel values intermediate to the N output levels to produce an output multi-level digital image.

12 Claims, 7 Drawing Sheets

COMBINING ERROR DIFFUSION, DITHERING AND OVER-MODULATION FOR SMOOTH MULTILEVEL PRINTING

FIELD OF THE INVENTION

This present invention relates to digital image processing and more particularly to a method for digitally multitoning a continuous-tone image using error diffusion, dithering and over-modulation methods.

BACKGROUND OF THE INVENTION

Digital halftoning is a technique employing digital image processing to produce halftone output image from a continuous-tone image. In the digital halftoning technique, a continuous-tone image is sampled, for example, with a scanner and the samples are digitized and stored in a computer. The digitized samples (or "pixels") consist of discrete values typically ranging from 0 to 255. To reproduce this image on an output device capable of printing dots of one gray level (e.g. black), it is necessary to convert the continuous-tone image to a binary output image using some form of halftoning techniques. Halftoning methods rely on the fact that an observer's eye will spatially average over some local area of the image so that intermediate gray levels can be created by turning some of the pixels "on" and some of the pixels "off" in some small region. The fraction of the pixels that are turned on will determine the apparent gray level. Common prior art methods of digital halftoning include error diffusion and dithering.

Error diffusion is an adaptive algorithm that produces patterns with different spatial frequency content depending on the input image value. FIG. 1 shows a block diagram describing a basic error diffusion technique disclosed in "An adaptive algorithm for spatial greyscale," *Proceedings of the Society for Information Display*, vol. 17, no. 2, pp. 75–77, 1976, by R. W. Floyd and L. Steinberg. For purpose of illustration it will be assumed that the continuous-tone input values span the range from 0 to 255. The continuous-tone input value for the current input pixel is thresholded 10 to form the output value. The threshold operator will return a 0 for any continuous-tone input value below the threshold, and a 255 for any continuous-tone input value above the threshold. A difference signal generator 12 receives the continuous-tone input value and the output value, and produces a difference signal representing the error introduced by the thresholding process. The difference signal is multiplied by a series of error feedback weights using a weighted error generator 14, and is provided to an adder 16 which adds the weighted difference signal to the continuous-tone input values of the nearby pixels that have yet to be processed to form modified continuous-tone input values. The propagation of the errors made during the thresholding process to the nearby pixels insures that the arithmetic mean of the pixel values is preserved over a local image region.

FIG. 2 illustrates a typical set of error feedback weights 14 which can be used to distribute the errors to the nearby pixels. The halftone output from error diffusion is considered to be of high quality generally, since most of the halftone noise is distributed in a high spatial frequency band where human visual sensitivity is relatively low. An artifact that is typically associated with error diffusion halftoning technique is known as "worms." Worms are formed when the black or white output pixels appear to string together in an area that should be otherwise uniform. Worm artifacts can be clearly seen in several areas of the output gray wedge (c) in FIG. 4 from the error diffusion halftoning technique, such as the light and dark ends of the gray wedge (c). Several of these worm artifacts are labelled as 40A–C.

Compared to the error diffusion technique, halftoning with a dithering technique is simpler in implementation, which is shown in FIG. 3. In this case, a periodic dither signal d(x', y') is determined by modularly addressing 30, 32 a dithering matrix 34 with the row and column addresses of the input pixels. The size of the dither matrix in this example is $M_x$ by $M_y$. The periodic dither signal is then provided to an adder 36 which adds the periodic dither signal to the input pixel value I(x,y) to form modified continuous-tone input values. The modified continuous-tone input pixel is then thresholded 38 to form the output value. The threshold operator will return a 0 for any modified continuous-tone input value below the threshold, and a 255 for any modified continuous-tone input value above the threshold. The modulo operations 30, 32 have the effect of tiling the dither matrix 34 across the image in a repeating pattern. Obviously, the arrangement of the values stored in the dither matrix will determine the output halftone patterns. Commonly used dither matrices are the clustered-dot dither matrices and the "Bayer matrix". However, due to the ordered structure imposed by these two matrices (thus called "ordered dithering"), the resulting halftone output normally contains distinct textures that are highly visible. Recent developments in the dithering technique have been concentrated on "blue-noise dithering" (for example see "Design of minimum visual modulation halftone patterns," *IEEE Trans. Syst. Man. Cybern.* SMC-21(1), pp. 33–38, 1991, by J. R. Sullivan, et al.; "Digital halftoning technique using a blue-noise mask," *Journal of Optical Society of America A* 9(11), pp. 1920–1929, 1992, by K. J. Parker, et al.; "Methods for generating blue-noise dither matrices for digital halftoning," *Journal of Electronic Imaging*, vol. 6, pp. 208–230, April 1997, by K. E. Spaulding, et al.; and, "Stochastic screen halftoning for electronic devices," *Journal of Visual Communication and Image Representation*, vol. 8, pp. 423–440, December 1997, by Q. Yu and K. J. Parker), where blue-noise dither matrices are designed that minimize the low frequency content and maximize the high frequency content in the halftone patterns, thus producing similar results as error diffusion halftone patterns. The blue-noise dither matrices are typically relatively large in size, and can be seamlessly tiled to cover the image due to the built-in wrap-around properties. The major artifact associated with blue-noise dithering is increased graininess at mid-tone gray levels, relative to that associated with error diffusion. The graininess artifact can be seen in the gray wedge (b) in FIG. 4, which is labelled as 42.

Recently, printing devices with multilevel output (N output levels, where N>2) capability have been brought to the market to achieve photographic image quality. Both dithering and error diffusion techniques can be generalized for these devices, in which case halftoning becomes multitoning. For multilevel dithering, the process is equivalent to the binary implementation in FIG. 3, except that the threshold operation 38 is replaced by a quantization operation. As before, the periodic dither signal is added to the input pixel value. The quantizer then associates one of the allowable output levels with each of the possible values of the modulated input pixel value. Similarly, for multilevel error diffusion, the process is equivalent to the binary implementation in FIG. 1 except that the thresholding 10 step is replaced with a quantization step.

FIG. 4 shows a continuous-tone gray wedge (a) along with outputs from binary blue-noise dithering (b), binary error diffusion (c), multilevel blue- noise dithering (d) and multilevel error diffusion (e). In the multitoning cases (d and e), the total number of output levels (N) is 4. It can be observed that overall image quality is improved while texture visibility is reduced from blue-noise dithering to error diffusion as well as from halftoning to multitoning. Also, the typical artifacts 40A–C, 42 associated with both error diffusion and blue-noise dithering are clearly visible.

It can be seen from FIG. 4 that both the multilevel error diffusion and multilevel dithering halftoning algorithm produce distinct contours near the 4 pure printing states (or "boundaries", or output gray levels). Additionally both of these two approaches result in distinct texture transitions near the 2 intermediate output levels. These can be called "texture contours", which are labelled as 44 in the two output wedges (d) and (e) in FIG. 4.

The texture contouring problem could be explained with the following analysis. For input image values right at the output levels, since there is no halftone (or multitone) error introduced, there is no visual noise. However, if the input value is a few code values away from those output levels, the output halftone pattern is rendered with sparse minority pixels over a uniform majority- pixel background. Since human visual system is very sensitive to these kinds of dot patterns, the perceived "grain" is much higher. Therefore, if an input continuous-tone input image contains a smooth transition across a certain boundary, then with the conventional multitoning approaches, there will be a distinct texture change in the output image which is observed as texture contouring within certain viewing distances.

"Digital multitoning evaluation with a human visual model," *Proceedings of NIP* 13: *International Conference on Digital Printing Technologies*, (Seattle, Wash.), IS&T, November 1997, by Q. Yu, et al discloses an approach to smooth the texture transition at the N output levels for multilevel blue-noise dithering with precisely controlled over-modulated dither patterns. A brief description is given here in below.

FIG. 5 shows the flow chart of the over-modulation method where a dither matrix guided modulation operation is added before the conventional multilevel dithering. For each input pixel value I(x,y) that is within a predetermined neighbourhood of a certain output level X, a modulation processor 50 is called, which requires as inputs the input pixel value I(x,y), the value of the specific output level X and a periodic dither signal S which is determined by modularly addressing 30, 32 a dither matrix with the row and column addresses of I(x,y). The modified input pixel value I'(x,y) is then used as the input for the conventional multitoning processor 52 to get the final output image value O(x,y). This over-modulation process is non-linear, and could be best described with the following pseudo computer code (assuming that the input pixel values range from 0 to 255):

```
D = I - X;
A = MAP(D);
if (D >= 0)
    if (S >= 128)
        I' = X - A;
    else
        I' = I + A;
else
    if (S >= 128)
        I' = I - A;
```
```
    else
        I' = X + A;
``` where MAP is a pre-set mapping function (a simple one 60 is shown in FIG. 6) that controls the degree of over-modulation such that the resulting output multilevel image will contain more than two output levels for those input pixel values near the N output levels.

Special blue-noise dither matrices have been designed, and along with the MAP function, they can precisely control the texture of the over- modulated patterns near the N output levels. It was found that the over-modulated patterns resulting from a "binar" dither matrix were preferred by human observers over those from other dither matrices. The "binar" dither matrix is so named since its large dither matrix elements are paired and are arranged to be adjacent to its small dither matrix elements. An example of the over-modulation patterns from a "binar" dither matrix is shown in FIG. 7, where pixels of lower output level 70 and pixels of higher output level 71 are introduced in pairs to an uniform input image whose pixel values are equal to one specific output level 72.

"An improved multilevel error diffusion method," *Journal of Imaging Science and Technology*, vol. 39, no. 6, pp. 495–501, 1995, by S. Sugiura, et al. discloses adding noise using a 4 by 4 ordered dither matrix for a wide range of input pixel values around the N output levels, thus eliminating the texture contouring at the N output levels for multilevel error diffusion. However, this is at the expense of increased halftone visibility over a wide range of the tonescale and the interaction between ordered dither matrix and error diffusion could result in artifacts due to the lack of precise control of halftone patterns around the N output levels.

SUMMARY OF THE INVENTION

It is an object of the present invention to eliminate the texture contouring problems at the N allowable output levels in multilevel rendering while maintaining the high quality of error diffuison.

This object is achieved with an adaptive method that combines the error diffusion halftoning technique, the dithering halftoning technique and an over-modulation scheme for producing an multilevel output image from an input image having a set of digitized continuous-tone pixels, comprising the steps of:

(a) computing a scaling factor according to the original input pixel value and generating a periodic dither signal by multiplying the scaling factor to the dither matrix elements of a fixed dither matrix;

(b) computing another scaling factor according to the original input pixel value and generate a set of error feedback weights by multiplying this scaling factor to a set of fixed error feedback weights;

(c) weighting the error signals from nearby pixels that have been already processed with the error feedback weights and added them altogether to generate an compensation signal;

(d) computing a modified input value by adding the original input pixel value with the periodic dither signal and the compensation signal;

(e) selecting the output level that is nearest to the modified input value; and, (f) determining a difference signal between the modified input value and the selected output level.

ADVANTAGES OF THE INVENTION

The present invention has the advantage that it eliminates the texture contouring in the output image at the allowable output levels while maintaining the high quality of error diffusion, thus eliminating the mid-level graininess artifacts associated with the prior art multilevel dithering algorithms. The present invention also has the advantage that it smoothes the texture transition between error diffusion and dithering halftone patterns by adjusting the error feedback weights according to the input pixel values and by adding over-modulation for input pixel values near those output levels.

DETAILED DESCRIPTION OF THE INVENTION

There are certain advantages to apply the error diffusion halftoning technique and the blue-noise dithering halftoning technique adaptively in the multitoning process. As stated previously, error diffusion patterns normally contain artifacts at highlights and shadows (for multitoning, these correspond to input image values in vicinity of any allowable output level), while blue-noise dither patterns have increased graininess at mid-tones. Therefore, an adaptive approach that switches between error diffusion and blue-noise dithering according to input image values should increase quality of the multitone output over the whole tonescale. This was proposed in U.S. Pat. No. 5,014,333 by Miller et. al. where they combined error diffusion and ordered dithering for binary printing. This algorithm, however, is only for binary halftoning, and is not intended for reducing texture-contouring artifacts at multilevel output levels. Since blue-noise dither patterns have more similar frequency spectra to error diffusion patterns than ordered dithering patterns, combining blue-noise dithering and error diffusion should reduce transition artifacts and further increase the overall image quality. Another advantage of using blue-noise dithering instead of conventional ordered dithering near boundaries is that the over-modulation technique proposed in "Digital multitoning evaluation with a human visual model," *Proceedings of NIP* 13: *International Conference on Digital Printing Technologies*, (Seattle, Wash.), IS&T, November 1997, by Q. Yu, et al., could be leveraged so that texture at those levels could be precisely controlled for improved smoothness. One potential problem with this combined approach is how to make a transition between the two processes (i.e., pure error diffusion and pure blue-noise dithering) without introducing artifacts into the resulting image arising from the transition itself. This problem is addressed in the present invention.

Figure 8:
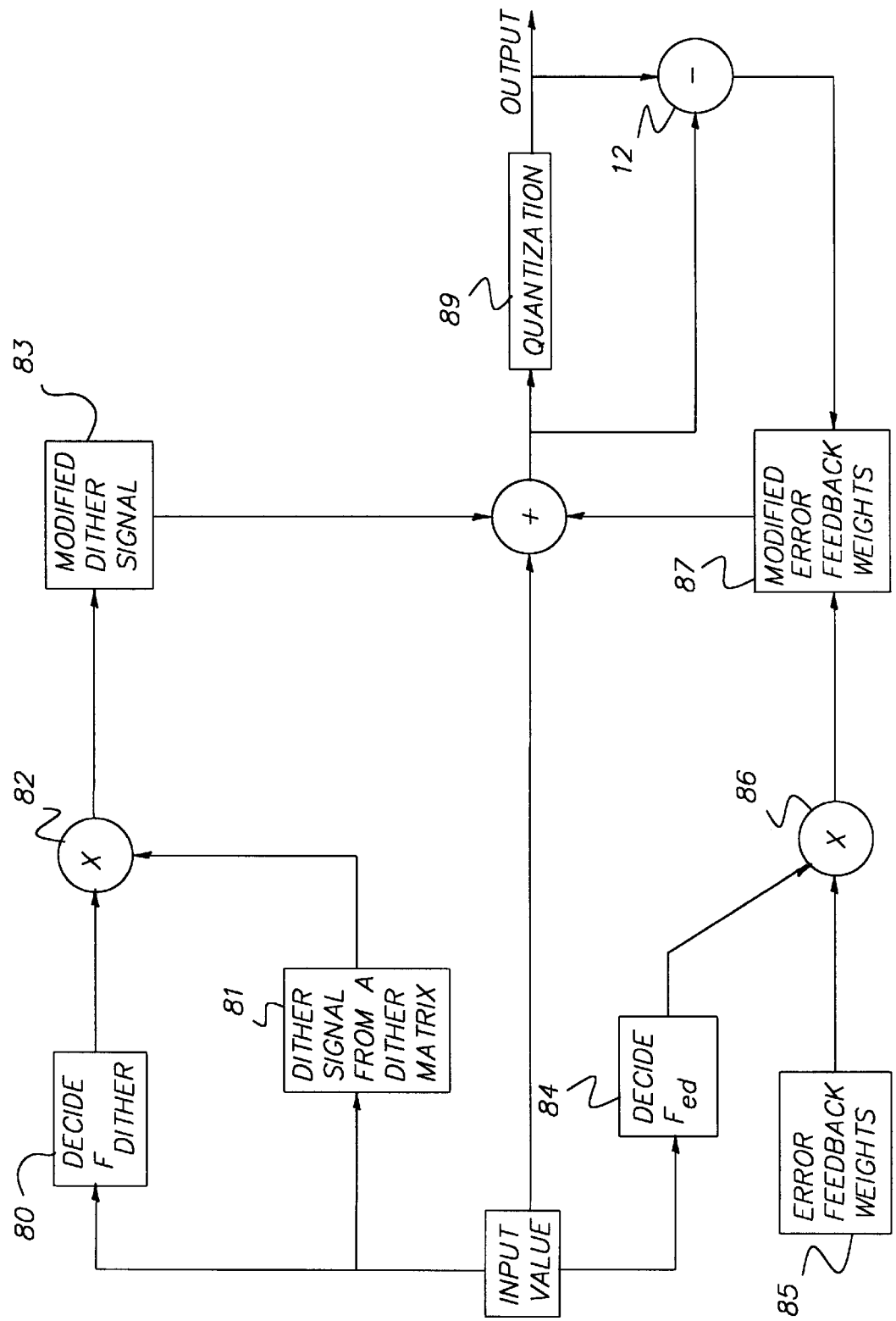
FIG. 8 is a logic diagram showing a method according to the present invention.

In the present invention, shown schematically in FIG. 8, a pixel located in row i, column j of the input image is denoted i(i,j).

A scaling factor generator 84 first determines a scaling factor Fed according to the value of i(i,j). A set of error feedback weights 87 are then generated using a multiplier 86 that scales a set of fixed error feedback weights 85 with $F_{ed}$. The difference signals from nearby pixels that have been already processed are weighted with the error feedback weights 87 and added altogether to generate a compensation signal c(i,j).

Another scaling factor generator 80 determines a scaling factor $F_{dither}$ according to the value of i(i,j). A periodic dither signal $d_m(i,j)$ 83 is then generated using a multiplier 82 that multiplies $F_{dither}$ with a dither matrix element 81, which is determined by modularly addressing 30, 32 a dithering matrix 34 with the row and column addresses of i(i,j).

An adder 88 is used to add c(i,j), $d_m(i,j)$ and the input pixel value i(i,j) to form a modified input pixel value i'(i,j), which is then sent to a quantizer 89 that selects the nearest output level to i'(i,j) as the output pixel value o(i,j). Finally, a difference signal between the modified input value i'(i,j) and the selected output level o(i,j) is determined using a difference signal generator 12 and saved for future processing.

It is instructive to note the settings of $F_{dither}$ and $F_{ed}$ for this method. The amplitude of $F_{dither}$ is set to a value greater than unity for those input pixel values i(i,j) near the N output levels so that the resulting output multilevel digital image will contain more than two output levels, and it falls to a small fraction number (i.e., 0.1) for i(i,j) intermediate to the N output levels. In some error diffusion implementations, random noise with small amplitude is normally added to the input image value to reduce the "worms" at highlights, shadows and certain mid-tone levels. In this case, the random noise perturbation is replaced with a blue-noise perturbation, and that is why $F_{dither}$ does not fall to zero at mid-ways so as to allow some small amplitude blue-noise perturbation. Near the N output levels, since $F_{dither}$ is near unity and $F_{ed}$ is near zero (as discussed below), a pure blue-noise dithering is realized.

In an opposite fashion, Fed is chosen so that it is generally unity (no attenuation) whenever i(i,j) is mid-way between two output levels, and it typically falls smoothly to zero (complete attenuation) as i(i,j) approaches any output level. With this scheme, the error diffusion process is attenuated in a non-abrupt manner. "Under-compensated error diffusion for multilevel printing," *Proceedings of SPIE: Color Hard Copy and Graphic Arts*, vol. 1912, pp. 482–487, 1993, by D. Birnbaum, et al. has shown that for multilevel error diffusion, the restriction of a full error feedback (error feedback weights added up to unity) to guarantee maintaining the gray average can be eased to allow for reduced feedback systems. For example, it was found that for a 5 level system, the feedback could be reduced to 50% (corresponding to attenuation factor of 0.5) without noticeable mean deviations. It was also found that reduced feedback could in turn enable the reduction of error diffusion artifacts caused by the non-symmetric error feedback weight distribution. Thus, the approach with adjusted error feedback weights should be able to maintain the mean of the input image while increasing the quality of output image simultaneously.

Figure 1:
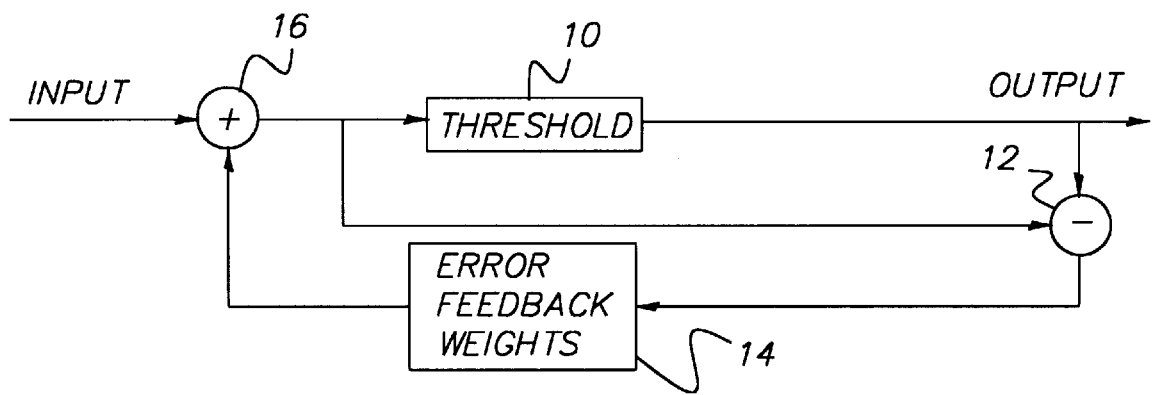
FIG. 1 is a logic diagram of a prior art error diffusion process.
Figure 2:
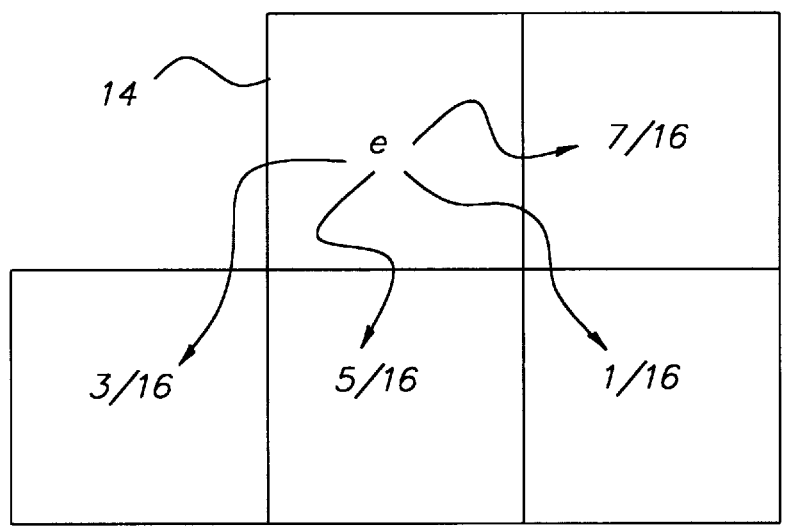
FIG. 2 shows a typical set of error feedback weights used in the FIG. 1 arrangement.
Figure 3:
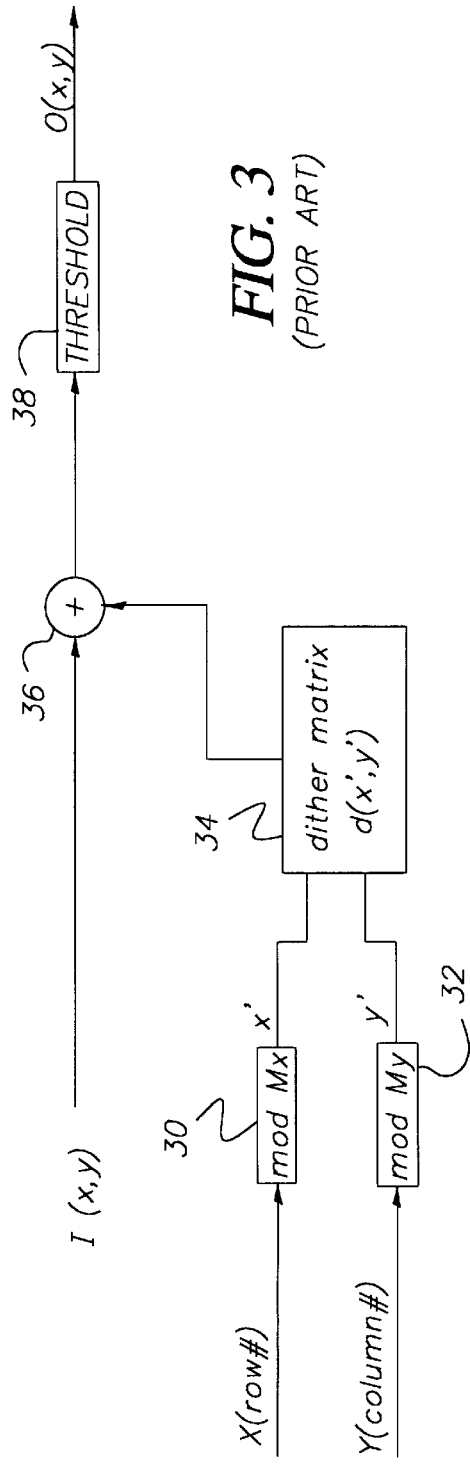
FIG. 3 is a logic diagram of a prior art binary dithering process with a dither matrix.
Figure 5:
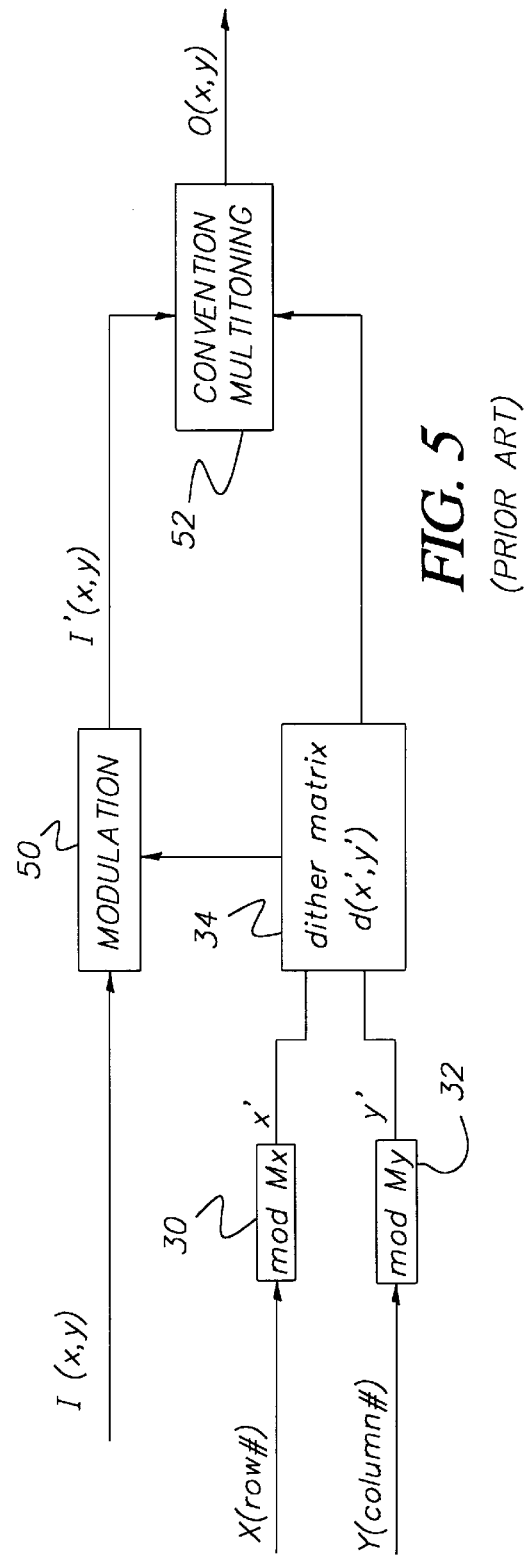
FIG. 5 is a logic diagram of a prior art over-modulation method.
Figure 4A:
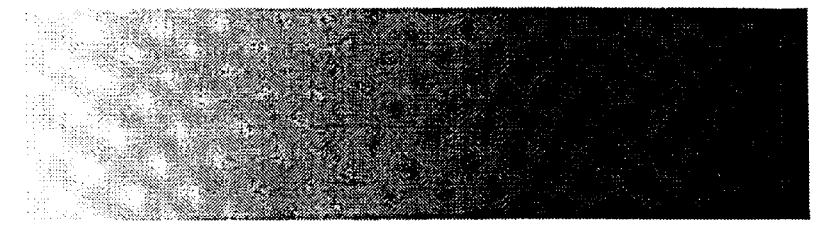
FIG. 4 depicts a continuous-tone gray wedge (a) along with four output wedges from four different halftoning/multitoning techniques: (b) binary blue-noise dithering, (c) binary error diffusion, (d) 4 level blue-noise dithering, (e) 4 level error diffusion.
Figure 4B:
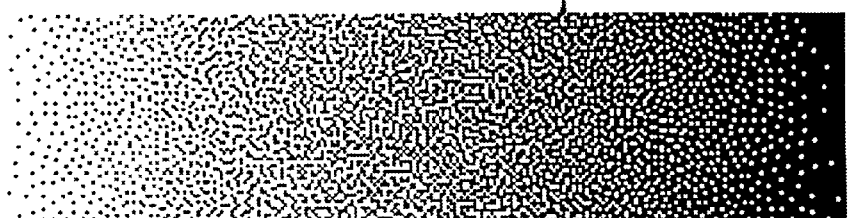
Figure 4C:
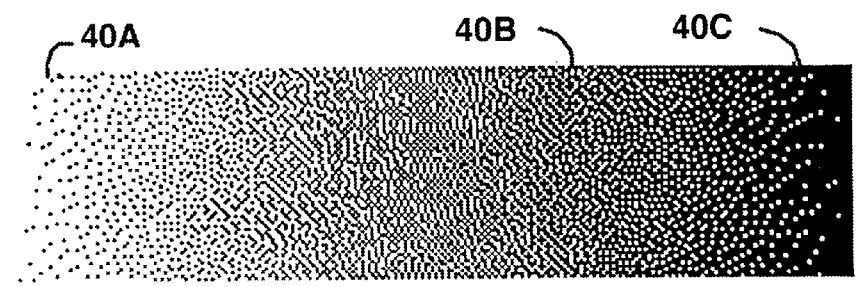
Figure 4D:
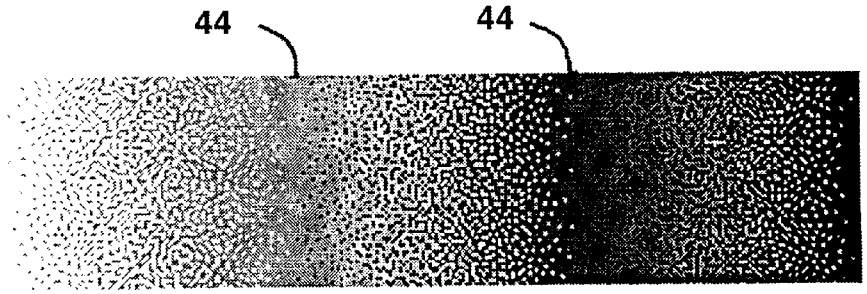
Figure 4E:
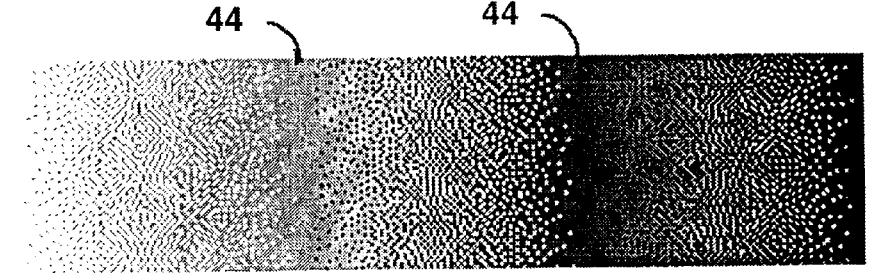
Figure 6:
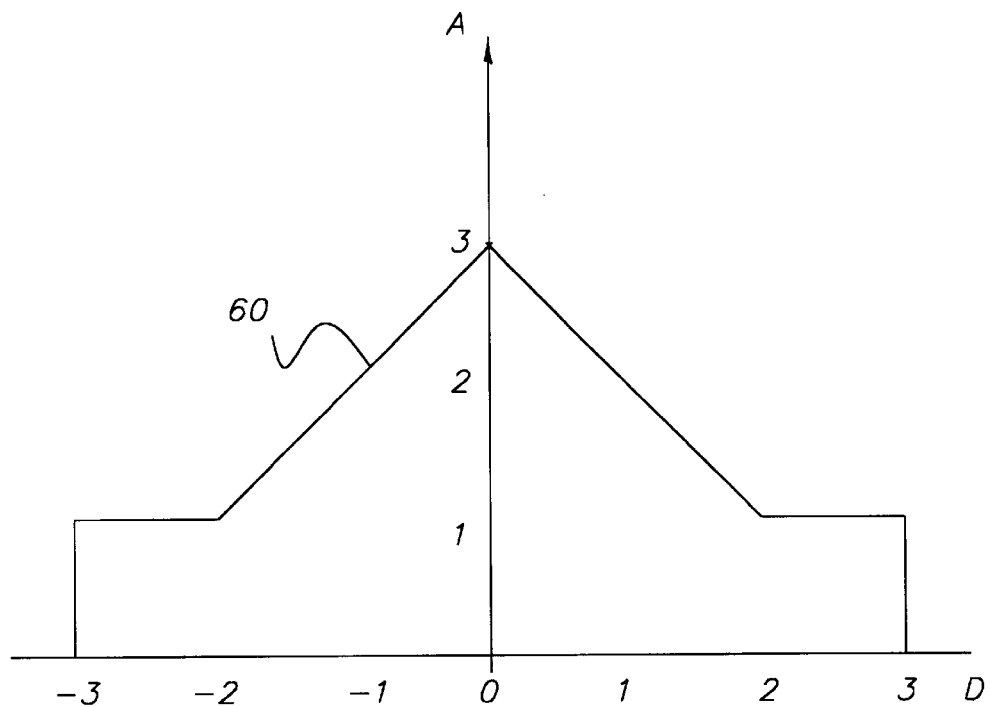
FIG. 6 is a sample graph describing a typical MAP function in the over-modulation method.
Figure 7:
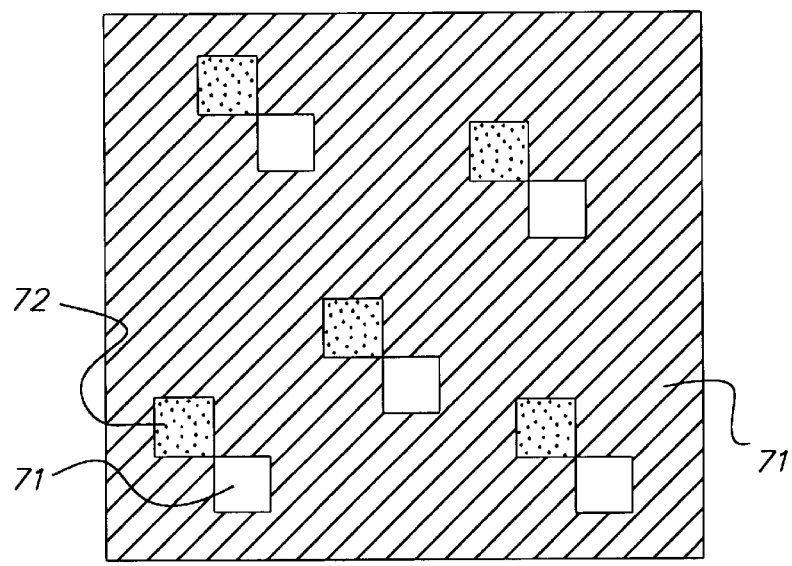
FIG. 7 depicts a sample image of over-modulation multitoning output patterns from a typical dither matrix, the "binar" dither matrix.
Figure 9:
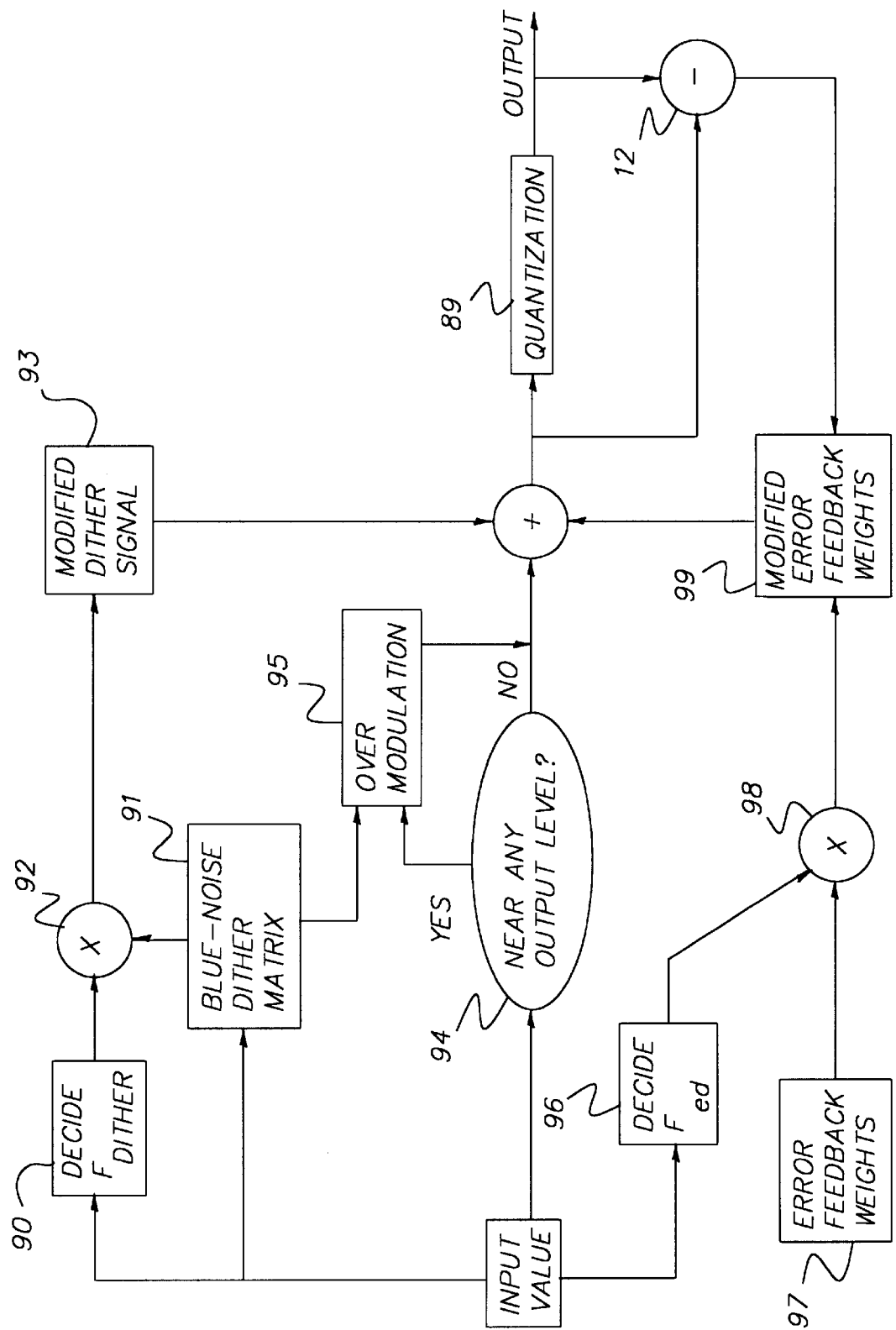
FIG. 9 is a logic diagram showing another method according to the present invention; and, FIG. 10 is a sample graph describing two typical functions for Fed and $F_{dither}$.
Figure 10:
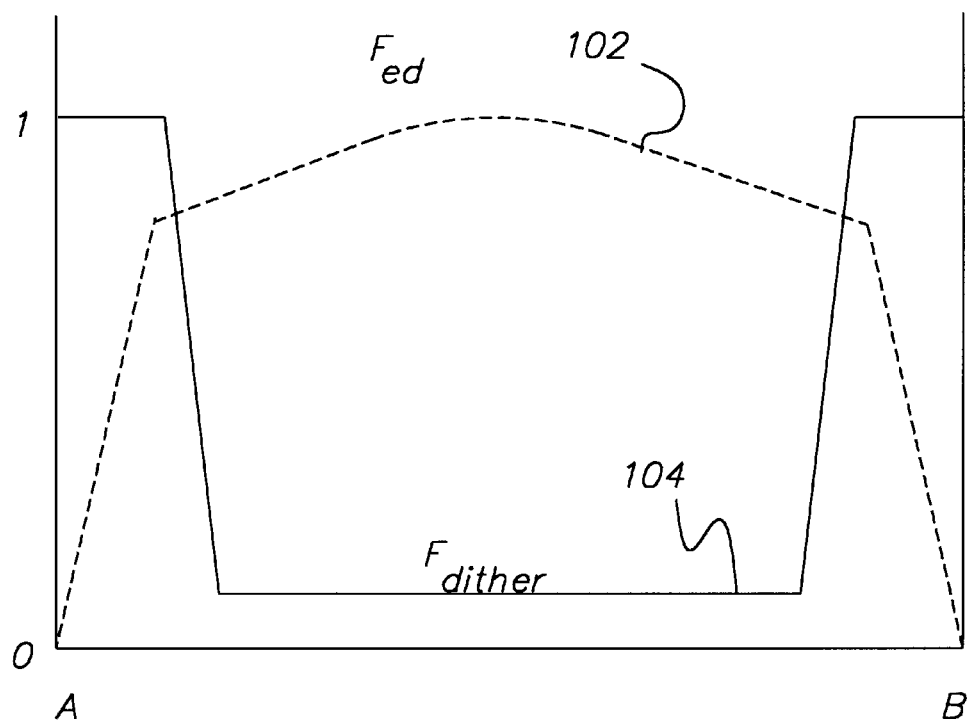

Another method according to the present invention is shown in FIG. 9. This method separates the dithering and over-modulation into two different steps, thus making the algorithm more computationally efficient and easier to follow. The detailed steps are as follows:

(1) Two scaling factors $F_{ed}$ 102 and $F_{dither}$ 104 are determined based on the input pixel value using two scaling factor generators 90, 96 $F_{dither}$ and $F_{ed}$ can be calculated at real-time using certain functions (i.e., as shown in FIG. 10) or they can be obtained from two pre-computed lookup tables;

(2) A set of error feedback weights 99 are generated by scaling a set of fixed error feedback weights 97 (i.e., FIG. 2) with $F_{ed}$ using a multiplier 98. A periodic dither signal $d_m(i,j)$ 93 is also generated by scaling the corresponding dither matrix element of a fixed blue-noise dither matrix 91 with $F_{dither}$ using a multiplier 92;

(3) Input values $i(i,j)$ are tested in a neighbourhood testing step 94 to decide if they are within a neighbourhood of any of the output levels. For those input values $i(i,j)$ that are within a neighbourhood of a certain output level, the over-modulation method 95 depicted in FIG. 5 is called to form a over-modulated input pixel value $i_{om}(i,j)$;

(4) Difference signals propagated from neighbouring pixels that have been already processed are weighted with the set of error feedback weights 99 and then summed together to a single compensation signal $c(i,j)$. Both $c(i,j)$ and $d_m(i,j)$ are then added to the input pixel $i(i,j)$ value (or over-modulated input pixel value $i_{om}(i,j)$ if over-modulation method is called) using an adder 100 to form a modified input value $i'(i,j)$;

(5) $i'(i,j)$ is then sent to a quantizer 89 that selects the nearest output level to $i'(i,j)$ as the output pixel value $o(i,j)$; and, (6) A difference signal between the modified input value $i'(i,j)$ and the selected output level $o(i,j)$ is determined using a difference signal generator 12, which is saved for future processing.

There are several parameters in this algorithm that can be adjusted to achieve high quality multitoning with smooth texture transition. For example, the functions used to calculate attenuation factors $F_{ed}$ and $F_{dither}$, the set of fixed error feedback weights, the fixed blue-noise dither matrix as well as those parameters associated with the over-modulation step. Optimal settings for these parameters can be obtained through objective and subjective experiments. Notice that these settings should be directly related to the specific printing environment, i.e., the specific printing engine, the total number of allowable printing states and their distribution over the tonescale.

The invention has been described with reference to a preferred embodiment. However, it will be appreciated that variations and modifications can be effected by a person of ordinary skill in the art without departing from the scope of the invention.

PARTS LIST 10 thresholding processor
12 difference signal generator
14 weighted error generator
16 adder
30 modulator
32 modulator
34 dither matrix
36 adder
38 thresholding processor
40A "worm" artifacts
40B "worm" artifacts
40C "worm" artifacts
42 graininess artifacts
44 texture contouring
50 over-modulation processor
52 conventional multitoning processor
60 a MAP function
70 pixel of lower output level
71 pixel of higher output level
72 pixel of the current output level
80 scaling factor generator for $F_{dither}$
81 dither signal generator
82 multiplier
83 modified dither signal
84 scaling factor generator for $F_{ed}$
85 a set of fixed error feedback weights
86 multiplier
87 modified error feedback weights
88 adder
89 quantizer
90 scaling factor generator for $F_{dither}$
91 a blue-noise dither matrix
92 multiplier
93 modified dither signal
94 neighbourhood testing step
95 over-modulation processor
96 scaling factor generator for $F_{ed}$
97 a set of fixed error feedback weights
98 multiplier
99 a set of modified error feedback weights
100 adder
102 scaling factor $F_{ed}$
104 scaling factor $F_{dither}$

We claim:

1. A method for multi-level halftoning an input digital image having an x,y array of input pixel values to produce an output image having N output levels comprising the steps of:

a) adding a periodic dither signal to the input digital image wherein the amplitude of the periodic dither signal is a function of the input pixel value for each input pixel, the amplitude of the periodic dither signal being larger for input pixel values near the N output levels, and the amplitude of the periodic dither signal being smaller for input pixel values intermediate to the N output levels to produce a modified input image; and b) applying a multi-level error diffusion halftoning algorithm to the modified input image wherein the error diffusion halftoning algorithm uses a set of error feedback weights, the error feedback weights being adjusted according to the original input pixel value for each input pixel, such that the sum of the error feedback weights is smaller for input pixel values near the N output levels, and the sum of the error feedback weights is larger for input pixel values intermediate to the N output levels to produce an output multi-level digital image.

2. The method of claim 1, wherein the periodic dither signal is supplied by a dither matrix having dither matrix elements which is modularly addressed by the x,y address of the input pixel, the periodic dither signal having a frequency spectra similar to that produced by the multi-level error-diffusion halftoning algorithm.

3. The method of claim 2, wherein the dither matrix is constructed by minimizing a visual cost function.

4. The method of claim 2, wherein large dither matrix elements of the dither matrix are paired with and are arranged to be adjacent to small dither matrix elements of the dither matrix.

5. The method of claim 1, wherein the amplitude of the periodic dither signal for input pixel values near the N output levels is large enough so that the resulting output multi-level digital image will contain more than two output levels for those input pixel values near the N output levels.

6. The method of claim 1, wherein a first periodic dither signal is added to the input digital image, and an additional periodic dither signal is added to the input digital image for input pixel values near the N output levels.

7. The method of claim 6, wherein the amplitude of the additional periodic dither signal is chosen so that the resulting output multi-level digital image will contain more than two output levels for those input pixel values near the N output levels.

8. The method of claim 6, wherein the additional periodic dither signal is generated by scaling the first periodic dither signal according to the difference between the input pixel value and the nearest output levels.

9. The method of claim 4, wherein the amplitude of the periodic dither signal for input pixel values at the N output levels is chosen to produce multi-level halftone patterns having a similar visibility to multi-level halftone patterns produced for input pixel values intermediate to the N output levels.

10. The method of claim 1, wherein the amplitude of the periodic dither signal is adjusted by scaling dither matrix elements of a fixed dither matrix, the scale factor being a function of the input pixel value.

11. The method of claim 1, wherein the error feedback weights are adjusted by scaling a set of fixed error feedback weights, the scale factor being a function of the input pixel value.

12. The method of claim 1, wherein the sum of the error feedback weights for input pixels values at the N output levels is zero.

* * * * *